Nov. 30, 1937.  S. W. ROLPH  2,100,921
STORAGE BATTERY
Original Filed Sept. 22, 1932  2 Sheets-Sheet 1

INVENTOR:
SAMUEL W. ROLPH
Kwis Hudson & Kent
ATTORNEYS

Nov. 30, 1937.  S. W. ROLPH  2,100,921

STORAGE BATTERY

Original Filed Sept. 22, 1932   2 Sheets-Sheet 2

INVENTOR:
SAMUEL W. ROLPH
Kwis Hudson & Kent
ATTORNEYS

Patented Nov. 30, 1937

2,100,921

UNITED STATES PATENT OFFICE 2,100,921

STORAGE BATTERY

Samuel W. Rolph, Cleveland Heights, Ohio, assignor to Willard Storage Battery Company, Cleveland, Ohio, a corporation of West Virginia Application September 22, 1932, Serial No. 634,284
Renewed June 21, 1937

4 Claims. (Cl. 136—168)

This invention relates to storage batteries and particularly to means for sealing the posts thereof in the battery cover.

The principal object of the invention is to provide a simple, effective and efficient means for sealing the posts of a storage battery against leakage of the battery solution to the exterior of the cover.

A further object of the invention is to provide an improved sealing means which is of such character that the cover may be slipped down over the posts without danger of breaking the cover.

A still further object of the invention is to provide an improved sealing means which is of such character that said means and the posts may be integrally united by lead-burning to complete the seal and lock said means against movement in all directions with respect to said cover.

Another object is to provide a sealing means for the posts of a storage battery which is of such character that the battery elements may be supported entirely by the cover.

Further and additional objects and advantages of the invention will become apparent hereinafter during the detailed description which is to follow of several embodiments thereof, which embodiments are illustrated in the accompanying drawings, wherein.

Figure 1:
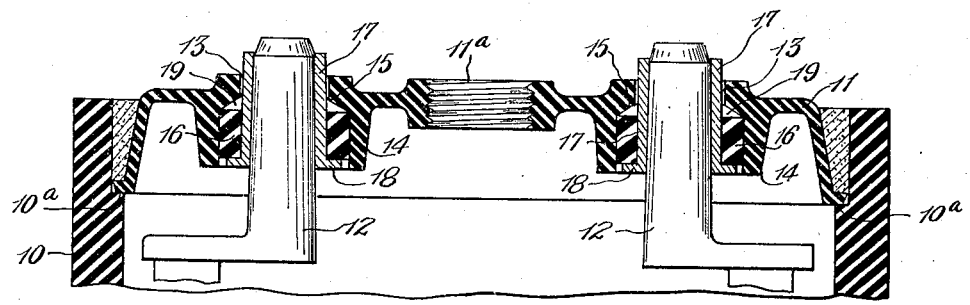
Figure 1 is a fragmentary vertical sectional view through a storage battery and shows one form of my invention.

Referring to Figs. 1 to 5, inclusive of the drawings, the battery container is shown at 10 and the cover 11 is supported in position thereon by the ledge 10a, such cover being provided with a vent opening 11a; the container and cover being formed of hard rubber, asphalt composition or other similar material. The battery may have any number of cells to each of which the present invention will be applied. The container 10 has arranged therein the customary positive and negative plates from which positive and negative lead posts 12 project upwardly through openings 13 in the cover. The cover 11 is provided in this instance on its under side and around each opening 13 with a depending flange 14, forming a recess, the diameter of which is somewhat larger than the diameter of the openings 13, thus providing a shoulder 15 which overhangs the space within the flange 14.

For the purpose of sealing the posts 12 of the battery in the cover 11, the following described arrangements are employed.

Figure 2:
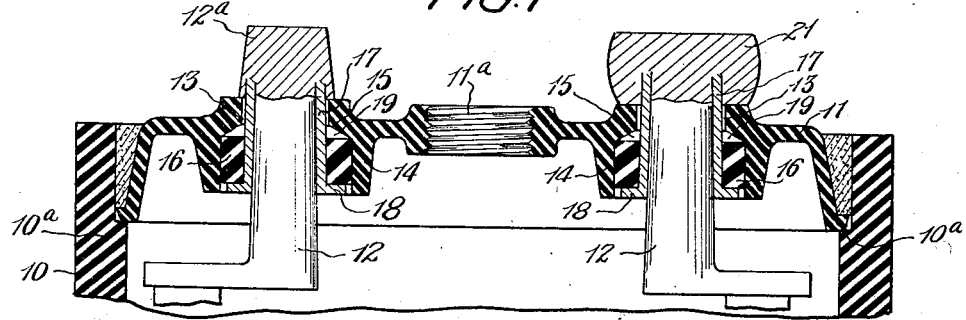
Fig. 2 is a vertical sectional view similar to Fig. 1, but shows the left-hand or terminal post of the battery as provided with a built-up enlargement at its outer end which integrally unites the post and lead sleeve of the sealing means, while the intermediate or right-hand post is shown as having a cross-connector lead-burned thereto and to the lead sleeve.

Referring first to Figs. 1 and 2 of the drawings, it will be seen that elastic bushings 16, preferably formed of soft rubber, are arranged within the recesses formed by the depending flanges 14 below the shoulders 15, a clearance space 19 being provided between the upper ends of the elastic bushings and the under side of the shoulders 15 to permit expansion of the bushings, as will later be referred to. Lead sleeves 17 fit tightly within the elastic bushings 16 and extend upwardly through the openings 13, there being a slight clearance between the outer circumference of the lead sleeves 17 and the wall of the openings 13. The inner ends of the lead sleeves 17 are, in this instance, provided with laterally extending annular flanges 18, which underlie and bear against the inner ends of the elastic bushings 16 and positively position the lead sleeves with respect to the elastic bushings and to the cover, and limit the upward movement thereof.

In order to prevent the leakage of the battery solution to the exterior of the cover between the elastic bushings 16 and the lead sleeves 17, it is necessary that the elastic bushings tightly grip the lead sleeves and that such bushings also tightly fit within the spaces formed by the depending flanges 14 on the underside of the cover. To accomplish this it is necessary that the openings in the elastic bushings 16 be normally smaller than the external diameter of the lead sleeves. The short lead sleeves may be forced through the openings in the elastic bushings after the bushings have been fitted in the recesses, since the elastic bushings can be compressed between the lead sleeves and the depending flange 14 that is, the bushings are expanded laterally by the sleeves and may, if necessary, expand lengthwise of the lead sleeve into the expansion spaces 19, or the bushings may be fitted on the sleeves and then the assembled bushings and sleeves forced into the recesses. Prior to positioning the cover upon the container and posts, the cover and the elastic bushings and the lead sleeves may be assembled with substantially no danger of breaking the cover.

The lead sleeves 17 have an internal diameter such that they will slip over the posts 12 and hence the cover 11, with the sealing means assembled thereon, may be positioned on the posts and container without danger of breaking the cover. The lead sleeves 17 extend beyond the outer side of the cover and are integrally united to the posts, as will now be described.

After the cover 11 has been positioned upon the container 10 with the posts 12 and lead sleeves 17 extending through the openings 13, the upper ends of the posts are integrally united with the lead sleeves 17. The terminal post, that is the left-hand post, as viewed in Figs. 1 and 2, has its upper end built-up to provide a portion 12a which overhangs the outer side of the cover adjacent the openings 13 and is of such size as to fit the usual terminal connecting clamp. The built-up portion 12a is formed by a lead-burning operation and integrally connects the post and lead sleeve 17, that is it forms with the post and lead sleeve an integral body, thus effectively forming a seal against the leakage of battery solution up along the post to the exterior of the cover. It will also be noted that when the built-up portion 12a is formed on the post and lead sleeve, such portion overhangs the cover 11 in addition to being integrally united with the lead sleeve and post, whereby the sealing means is held against displacement in any direction.

It is proposed to secure to the intermediate or right-hand post, as viewed in Figs. 1 and 2, the usual cross-connector for connecting the cells of the battery, which connector is secured to the post by lead-burning. Referring to Fig. 2, the connector 21 is positioned with the post 12 and lead sleeve 17 extending into the socket thereof so that the lead-burning operation unites into one homogeneous or integral body the post 12, connector 21 and lead sleeve 17 and thus completes the seal and maintains the sealing means against displacement in any direction in the same way as does the built-up portion 12a on the terminal post.

Figures 3, 4:
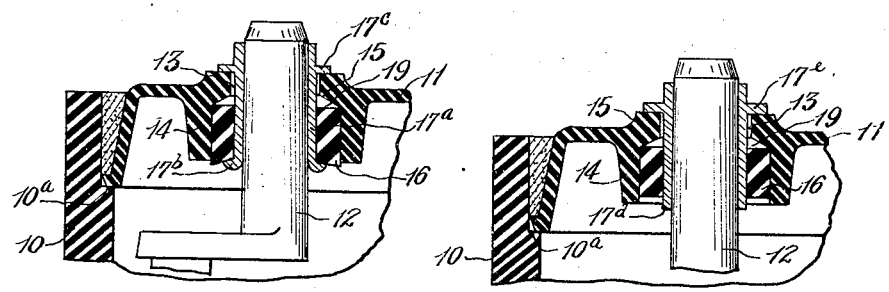
Fig. 3 is a fragmentary vertical sectional view disclosing another form of the invention from that shown in Figs. 1 and 2.
Fig. 4 is a fragmentary vertical sectional view showing a seal different from the form of the invention shown in Figs. 1 and 3.
Figure 5:
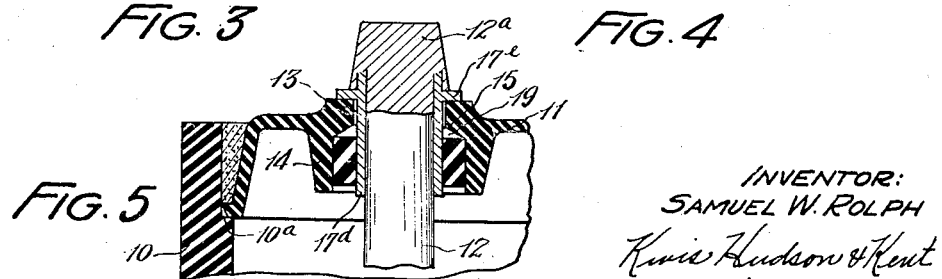
Fig. 5 is a fragmentary view similar to Fig. 4, but showing the post provided with a built-up enlarged outer end that is integrally united to the lead sleeve of the sealing means.

In Fig. 3, the lead sleeve 17a is provided at its inner end with an out-turned portion 17b underlying and bearing against the elastic bushing 16 and at its outer end with a laterally extending annular flange 17c which overlies and bears against the cover 11. The elastic bushing 16 may be positioned upon the lead sleeve 17a and in the recess formed by the flange 14 of the cover by forcing the bushing into the recess and upon the sleeve 17a after the latter has been passed inwardly through the openings 13, the out-turned portion 17b being formed on the sleeve after the bushing has been assembled thereon.

Referring to Fig. 4 of the drawings the lead sleeve 17d is shown as provided at its upper end with a laterally extending annular flange 17e, corresponding to the flange 17c in Fig. 3 and overlying and bearing against the outer side of the cover 11 surrounding the opening 13.

Since the manner in which the upper ends of the posts 12 are integrally united with the sleeves 17a and 17d is the same in both of the forms shown in Figs. 3 and 4, it is only necessary to illustrate one of the forms as having the post provided with a built-up portion 12a. Therefore, referring to Fig. 5, it will be seen that the terminal post 12 is provided with a built-up portion 12a corresponding to the built-up portion disclosed in Fig. 2 and that such portion integrally unites the post and the flange 17e of the lead sleeve 17d. Of course, the intermediate posts of a battery employing the forms of the invention shown in Figs. 3 and 4 would have the cross-connector 21 secured to their outer ends in the same way as the cross-connector is shown secured to the right-hand post 12 in Fig. 2. The lead-burning of the cross-connector to the post 12 would integrally unite the post, connector, and flange 17e of the lead sleeve.

Referring to Figs. 6 to 11, inclusive, it will be seen that the invention may be embodied in still different forms. In these forms the cover for the battery container is indicated at 22 and such cover has the recess 23 for the sealing means arranged on its outer side in place of its under side as in the forms shown in Figs. 1 to 5, inclusive, the bottom of the recess 23 being provided with an opening 24.

Figures 6, 8:
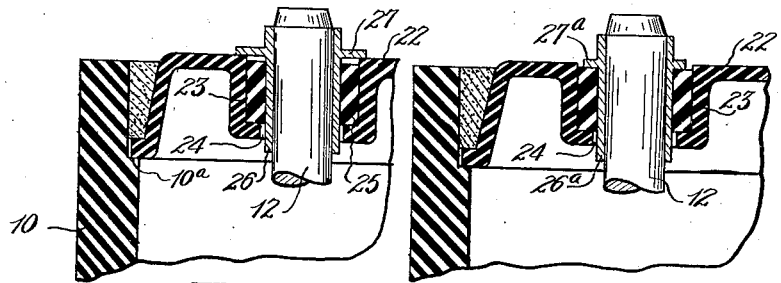
Figs. 6 and 7 are sectional views of another modified form of the invention.
Figs. 8 and 9 illustrate a still different form of the invention from those previously shown.
Figures 7, 9:
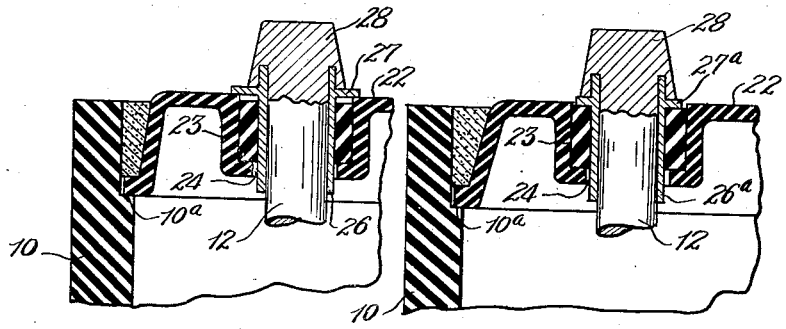

In Figs. 6 and 7 the elastic bushing 25 fits within the recess 23 with its upper end below the outer end of the recess. The lead sleeve 26 fits within the bushing and has its lower end extending inwardly of the container 10 through the opening 24 in the bottom of the recess. The sleeve is provided adjacent to but inwardly of its outer end with an annular flange 27 which bears upon the outer side of the cover 22. The posts 12 may be integrally united with the lead sleeves 26 and the flanges 27 thereof by a built-up portion 28 formed on the outer ends of the posts by a lead-burning operation, as shown in Fig. 7, or by lead-burning cross-connectors to the posts, as will be understood.

A slightly different form of the invention from that shown in Figs. 6 and 7 is illustrated in Figs. 8 and 9. In this form the annular flange 27a on the lead sleeve 26a is of reduced width and bears upon the upper end of the elastic bushing instead of upon the outer side of the cover. The lead sleeve 26a is integrally united with the post 12 in the same manner as is the lead sleeve 26 in the form shown in Figs. 6 and 7.

Figures 10, 11:
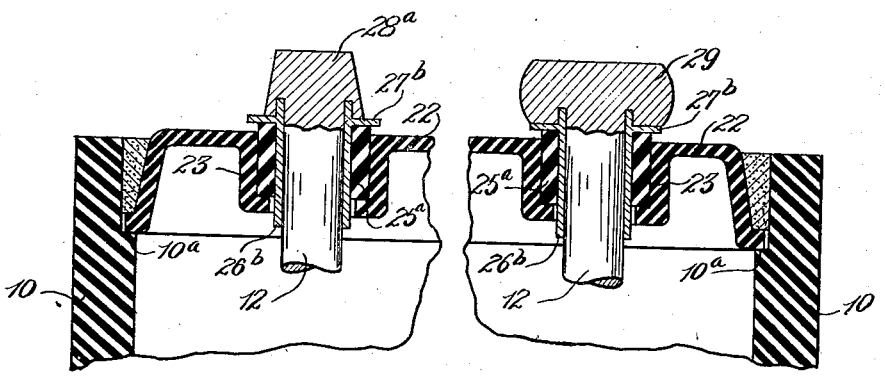
Figs. 10 and 11 show a further modification of the invention.

In the form shown in Figs. 10 and 11 the elastic bushing 25a extends outwardly of the recess 23 beyond the outer side of the cover 22 and the flange 27b of the lead sleeve 26b bears upon the end of the outwardly extending portion of the bushing instead of upon the outer side of the cover. In Fig. 10 the lead sleeve 26b is shown as integrally united with the post 12 by a built-up portion 28a while in Fig. 11 it is shown united to the post by a cross-connector 29 lead-burned thereto.

It will be seen that in all forms of the invention the posts and the lead sleeves are integrally united into a homogeneous body with the result that an effective seal is provided for the prevention of the leakage of the battery solution to the exterior of the cover. It will also be noted that the sealing means can be assembled in the cover before positioning the cover upon the container and post, after which the cover with the sealing means thereon can be mounted upon the battery container and post without danger of breaking the cover. It will further be noted that, when the posts are provided with the built-up portions 12a, or have the cross-connectors 21 lead-burned thereto, such portions or connectors will overhang the cover and, being integrally united with the posts and lead sleeves, will prevent displacement of the sealing means with respect to the cover, since said means is locked against movement in all directions.

The battery plates or elements may be supported from the bottom of the container or they may be supported solely by the cover, since the construction of the sealing means is such as to permit the latter arrangement.

Although several preferred embodiments of the invention have been illustrated and described herein, it will be understood that the invention is susceptible of various modifications and adaptations within the scope of the appended claims.

Having thus described my invention, I claim:

1. In a storage battery, a cover for the battery container having a post opening and a cylindrical recess on its underside beneath the opening concentric therewith but of larger diameter than the opening whereby a portion of the cover overhangs the recess, an elastic bushing in said recess and provided with a central opening, there being a space between the top of the bushing and the overhanging portion of the cover, and a metallic sleeve extending through the opening in the bushing and of an exterior diameter such as to expand said bushing laterally outwardly into tight frictional engagement with the wall of said recess and of an interior diameter such that the battery post may pass readily therethrough, said sleeve being of a length such as to extend through the opening in and above the top of the cover and having at its inner end a laterally extending flange engaging the underside of said bushing.

2. In a storage battery a cover for the battery container having a post opening and a recess aligned with and of larger diameter than said opening, an elastic bushing fitted in said recess and having a central opening, and a metallic sleeve tightly fitted in the opening in said bushing and extending through said post opening in said cover and laterally expanding said bushing into tight frictional engagement with the wall of said recess.

3. In a storage battery a cover for the battery container having a post opening and a recess aligned therewith and of larger diameter than said opening, an elastic bushing tightly fitted in said recess and having a central opening, and a metallic sleeve having an external diameter greater than the central opening in said bushing and positioned in said bushing and extending through said post opening and laterally expanding said bushing into frictional engagement with the wall of said recess, said metallic sleeve having an internal diameter such as to readily receive the battery post.

4. In a storage battery a container having a cover provided with openings and with recesses aligned with said openings, elastic bushings tightly fitted in said recesses and having central openings aligned with the openings in said cover, metallic sleeves extending through the openings in said bushings and said cover and beyond the outer side of the latter and of an external diameter greater than the diameter of the openings in said bushings, whereby said bushings are laterally expanded by said sleeves into tight frictional engagement with the walls of said recess, battery posts extending through said sleeves, one of said posts having an enlarged outer end overhanging said cover adjacent the opening therein and integrally united with one of said sleeves, and a connector integrally united with another of said sleeves and its associated post.

SAMUEL W. ROLPH.